(12) United States Patent
Tavares (10) Patent No.: US 7,788,101 B2
(45) Date of Patent: Aug. 31, 2010

(54) ADAPTATION METHOD FOR INTER-PERSON BIOMETRICS VARIABILITY

(75) Inventor: Clifford Tavares, San Carlos, CA (US)

(73) Assignee: Hitachi, Ltd., Tokyo (JP)

( * ) Notice: Subject to any disclaimer, the term of this patent is extended or adjusted under 35 U.S.C. 154(b) by 1108 days.

(21) Appl. No.: 11/263,752

(22) Filed: Oct. 31, 2005

(65) Prior Publication Data

US 2007/0100622 A1    May 3, 2007

(51) Int. Cl.
*G10L 21/00* (2006.01)
*G10L 17/00* (2006.01)

(52) U.S. Cl. .................. 704/273; 704/246; 704/250

(58) Field of Classification Search ............... 704/246, 704/250, 273
See application file for complete search history.

(56) References Cited

U.S. PATENT DOCUMENTS

| | | | | |
|---|---|---|---|---|
| 4,292,471 | A | * | 9/1981 | Kuhn et al. ............ 704/238 |
| 5,522,012 | A | * | 5/1996 | Mammone et al. ....... 704/250 |
| 5,675,704 | A | * | 10/1997 | Juang et al. ............ 704/246 |
| 6,003,002 | A | * | 12/1999 | Netsch ................. 704/236 |
| 6,012,027 | A | | 1/2000 | Bossemeyer, Jr. |
| 6,058,364 | A | * | 5/2000 | Goldberg et al. ........ 704/252 |
| 6,081,660 | A | * | 6/2000 | Macleod et al. ........... 703/2 |
| 6,141,644 | A | * | 10/2000 | Kuhn et al. ............ 704/273 |
| 6,311,272 | B1 | * | 10/2001 | Gressel ................ 713/186 |
| 6,401,063 | B1 | * | 6/2002 | Hebert et al. ............ 704/234 |
| 6,567,765 | B1 | * | 5/2003 | Wu et al. ................ 702/182 |

(Continued)

OTHER PUBLICATIONS

Anil K. Jain et al., "An Introduction to Biometric Recognition," IEEE Transactions on Circuits and Systems for Video Technology, Jan. 2000, pp. 4-20, vol. 14, No. 1, IEEE.

(Continued)

*Primary Examiner*—Richemond Dorvil
*Assistant Examiner*—Douglas C Godbold
(74) *Attorney, Agent, or Firm*—Squire, Sanders & Dempsey, L.L.P.

(57) ABSTRACT

Embodiments of a system and method for verifying an identity of a claimant are described. In accordance with one embodiment, a feature may be extracted from a biometric sample captured from a claimant claiming an identity. The extracted feature may be compared to a template associated with the identity to determine the similarity between the extracted feature and the template with the similarity between them being represented by a score. A determination may be made to determine whether the identity has a correction factor associated therewith. If the identity is determined to have a correction factor associated therewith, then the score may be modified using the correction factor. The score may then be compared to a threshold to determine whether to accept the claimant as the identity. In accordance with a further embodiment, during enrollment of a subject in a biometric verification system, a feature may be extracted from a biometric sample captured from the subject requesting enrollment and a standard deviation for the feature may then be calculated. A determination may then be performed to determining whether the standard deviation of the feature is greater than a standard deviation of a centroid of a density function. If the standard deviation of the feature is greater than the standard deviation of the centroid, then a correction factor for the subject may be derived based on a trend line of the density function.

6 Claims, 7 Drawing Sheets

U.S. PATENT DOCUMENTS

| | | | |
|---|---|---|---|
| 6,577,997 B1* | 6/2003 | Gong | 704/252 |
| 6,591,224 B1 | 7/2003 | Sullivan et al. | |
| 6,681,205 B1 | 1/2004 | San Martin et al. | |
| 6,691,089 B1* | 2/2004 | Su et al. | 704/244 |
| 6,697,778 B1* | 2/2004 | Kuhn et al. | 704/243 |
| 6,760,701 B2* | 7/2004 | Sharma et al. | 704/249 |
| 6,823,305 B2* | 11/2004 | Eide | 704/234 |
| 6,895,376 B2* | 5/2005 | Perronnin et al. | 704/250 |
| 7,409,343 B2* | 8/2008 | Charlet | 704/246 |
| 7,487,089 B2* | 2/2009 | Mozer | 704/246 |
| 7,490,043 B2* | 2/2009 | Tavares | 704/273 |
| 2002/0095287 A1* | 7/2002 | Botterweck | 704/250 |
| 2003/0036904 A1 | 2/2003 | Chaudhari et al. | |
| 2004/0107099 A1* | 6/2004 | Charlet | 704/234 |
| 2004/0128130 A1* | 7/2004 | Rose et al. | 704/236 |
| 2005/0033573 A1* | 2/2005 | Hong et al. | 704/250 |
| 2005/0055214 A1* | 3/2005 | Kirovski et al. | 704/273 |
| 2006/0036443 A1* | 2/2006 | Chaudhari et al. | 704/273 |
| 2007/0129941 A1* | 6/2007 | Tavares | 704/226 |

OTHER PUBLICATIONS

Ruud M. Bolle et al., "Evaluation Techniques for Biometrics-based Authentication Systems (FRR)," IBM Computer Science Research Report, 2000, 7 pages, RC 21759.

Maarten Willems, "Biometrics: Detecting the "Goats" Layering Speech and Other Biometrics Improves Performance Above the Best of Any Individual Performance," Speech Technology Magazine, http://www.speechtechmag.com/issues/3_3/cover/442-1.html, Jun./Jul. 1998, 8 pages.

* cited by examiner

ADAPTATION METHOD FOR INTER-PERSON BIOMETRICS VARIABILITY

TECHNICAL FIELD

Embodiments described herein relate generally to speech recognition and more particularly relate to speaker verification.

BACKGROUND

Biometrics is the science and technology of measuring and statistically analyzing biological data. A biometric is a measurable, physical characteristic or personal behavioral trait used to recognize the identity, or verify the claimed identity, of an enrollee. In general, biometrics statistically measure certain human anatomical and physiological traits that are unique to an individual. Examples of biometrics include fingerprints, retinal scans, hand recognition, signature recognition, and speaker recognition.

Verification (also known as authentication) is a process of verifying the user is who they claim to be. A goal of verification is to determine if the user is the authentic enrolled user or an impostor. Generally, verification includes four stages: capturing input; filtering unwanted input such as noise; transforming the input to extract a set of feature vectors; generating a statistical representation of the feature vector; and performing a comparison against information previously gathered during an enrollment procedure.

Speaker verification systems (also known as voice verification systems) attempt to match a voice of a speaker whose identity is undergoing verification with a known voice. Speaker verification systems help to provide a means for ensuring secure access by using speech utterances. Verbal submission of a word or phrase or simply a sample of an individual speaker's speaking of a randomly selected word or phrase are provided by a claimant when seeking access to pass through a speaker recognition and/or speaker verification system. An authentic claimant is one whose utterance matches known characteristics associated with the claimed identity.

To train a speaker verification system, a claimant typically provides a speech sample or speech utterance that is scored against a model corresponding to the claimant's claimed identity and a claimant score is then computed to confirm that the claimant is in fact the claimed identity.

There exist groups of users that have unstable or unreliable biometric data that cause biometric systems to falsely reject them. These users with unstable or unreliable biometric data may be referred to as "goats." Implementation of biometric systems capable of providing increased acceptance rates for such users could be advantageous.

SUMMARY

Embodiments of a system and method for verifying an identity of a claimant are described. In accordance with one embodiment, a feature may be extracted from a biometric sample captured from a claimant claiming an identity. The extracted feature may be compared to a template associated with the identity to determine the similarity between the extracted feature and the template with the similarity between them being represented by a score. A determination may be made to determine whether the identity has a correction factor associated therewith. If the identity is determined to have a correction factor associated therewith, then the score may be modified using the correction factor. The score may then be compared to a threshold to determine whether to accept the claimant as the identity.

In another embodiment, the biometric sample may comprise a speech sample spoken by the claimant. In one embodiment, the correction factor may be derived from a biometric sample captured from the claimed identity. The correction factor may also be retrieved from a correction factor data store. To modify the score, the correction factor may be added to the score. In one embodiment, the correction factor may have a negative value. In another embodiment, the claimant may be rejected if the score of the claimant is determined to exceed the threshold.

In accordance with a further embodiment, during enrollment of a subject in a biometric verification system, a feature may be extracted from a biometric sample captured from the subject requesting enrollment and a standard deviation for the feature may then be calculated. A determination may then be performed to determining whether the standard deviation of the feature is greater than a standard deviation of a centroid of a density function. If the standard deviation of the feature is greater than the standard deviation of the centroid, then a correction factor for the subject may be derived based on a trend line of the density function.

In one embodiment, the correction factor may be stored in correction data store. In another embodiment, the density function may comprise a match score vs. standard deviation density function of a sample population. In a further embodiment, the correction factor is further derived from the difference between a mean score obtained from the centroid and a score for the subject derived from the trend line. As a further option, a determination may be performed to determining whether the standard deviation of the feature exceeds a threshold value. If the standard deviation of the feature is determined to exceed the threshold value, then the threshold value may be used in place of the standard deviation of the feature to derive the correction factor for the subject.

DETAILED DESCRIPTION

For most biometrics, a small percentage of people exhibit biometrics features that are unreliable for use in biometric verification or identification. For example, older people often tend to have very light fingerprints that are unsuitable for a fingerprint based biometric system. As another example, a person may have a medical condition that makes their voice unstable and therefore unsuitable for a speech based biometric system. Embodiments described herein may be implemented for helping to adapt a biometric system to such users without compromising the overall accuracy of the biometric system's decision algorithm.

More particularly, biometric feature vectors derived from a biometrics enrollment process can be used to determine the variance in an enrollee's (i.e., a user) biometrics. During enrollment, a relationship between a user's biometric features (i.e., feature vectors) and the reliability of a given biometric system can be used to identify such users/enrollees that have features that are unreliable for the given biometric system. During verification, the biometric match-score of an enrollee with unreliable features may be assigned a small correction to help allow subsequent correct verification of the user in question. These corrections can be computed during enrollment.

Such a mechanism helps to afford the reliably use of a biometrics system by users that would otherwise be unreliable for the biometric system. Since embodiments of the adaptation process may be implemented so that it only affects the verification match scores of enrollees with unreliable biometric features, the overall behavior of a biometric system may remains unaffected for those enrollees having biometric features that are more reliable. Further, these adjustments to a biometric system for unreliable users can be minimal.

In general, the embodiments described herein may involve one or more of the following phases or processes: (1) offline training, (2), computation of a correction factor; and (3) application of the correction factor. The various aspects and features of these phases will now be described in the following exemplary embodiments. While the exemplary embodiments described herein are described in the context of a voice or speech based biometric system, one of ordinary skill in the art should be able to implement embodiments using other biometrics (e.g., fingerprints, iris, etc.).

Offline Training

Figure 1:
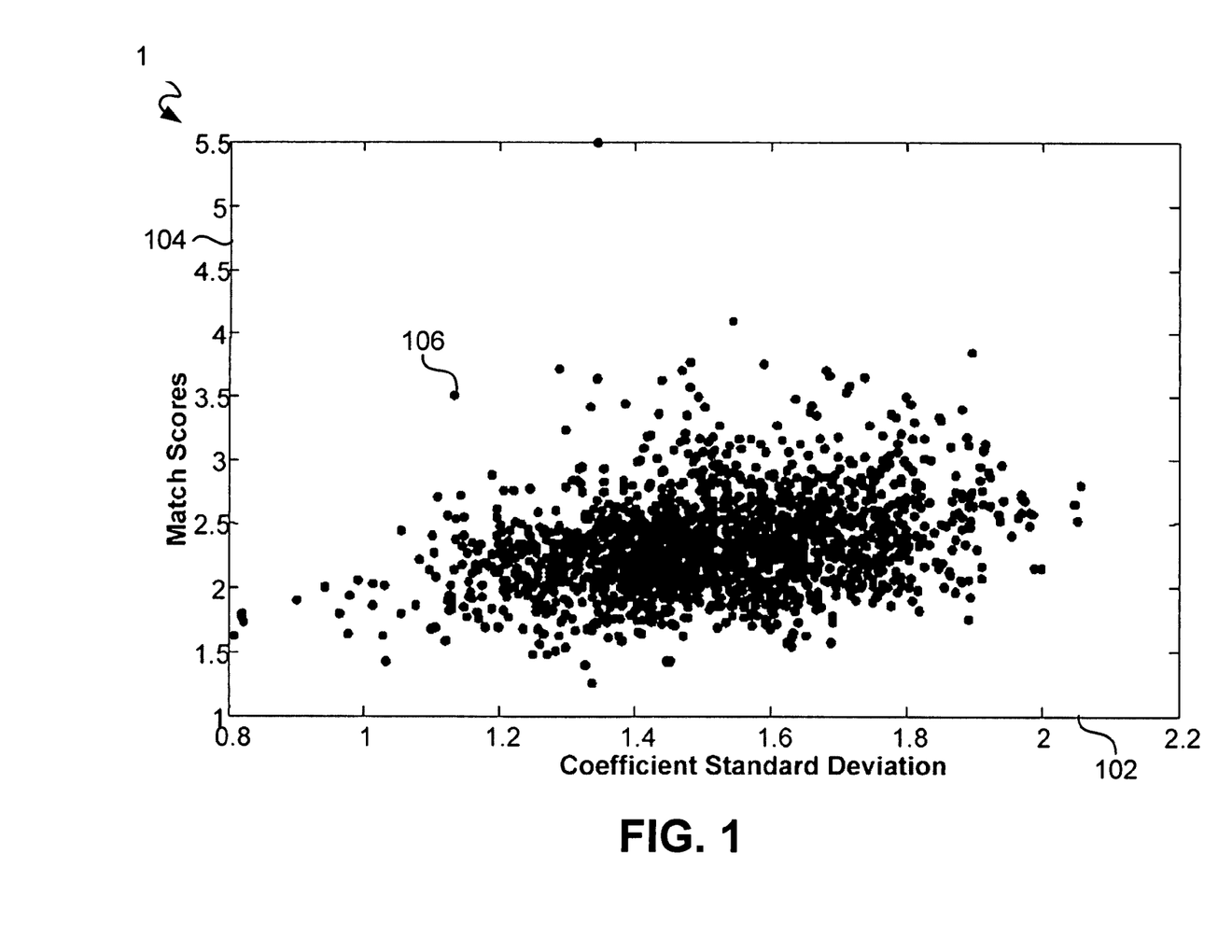
FIG. 1 is a density function graph for an exemplary population where match scores are plotted against standard deviations of each sample in the exemplary population in accordance with an illustrative embodiment.

In offline training, a relationship between a persons biometric features and the reliability of biometrics identification system may be developed. FIG. 1 is a density function graph 100 for an exemplary population where match scores between feature vectors and reference templates of an exemplary population are plotted against standard deviations of each sample in the population. The exemplary density function graph 100 shown in FIG. 1 is based on speech data in a voice biometrics application implementation. The x-axis 102 of the graph 100 represents standard deviation values and the y-axis 104 represents match score values. In this example, the smaller the match score, the better the match between the feature vector and the reference template (i.e., a smaller match score indicates a better match). Each point (e.g., point 106) in the density function graph 100 of FIG. 1 represents the plotting of a match score to standard deviation of a feature vector of a given biometric sample.

Based on the distribution of points in the graph of FIG. 1, the following observations can be made: (1) the data is clustered towards a center that represents a centroid of the distribution area; and (2) the match score of a given sample tends to increase as the standard deviation (SD) of the sample increases. As a result, it can be inferred from the graph 100 shown in FIG. 1 that users with smaller standard deviations may have smaller match scores (i.e., better matches between their feature vectors and reference template).

Figure 2:
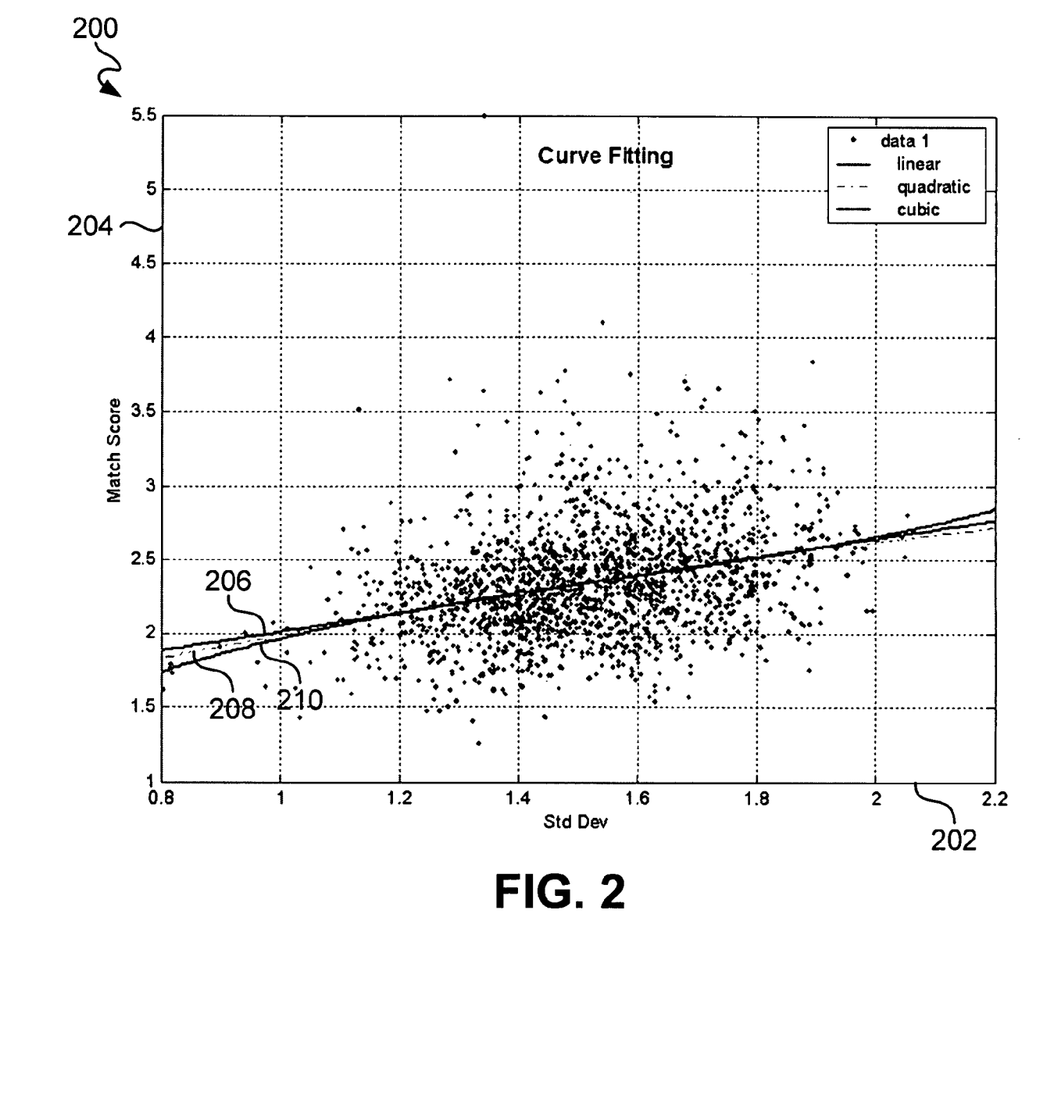
FIG. 2 is a density function graph of an exemplary population with various trend lines applied thereto in accordance with an illustrative embodiment.

FIG. 2 is a density function graph 200 for an exemplary population where match scores between feature vectors and reference templates of an exemplary population are plotted against standard deviations of each sample in the population. As in the graph 100 shown in FIG. 1, in this graph 200, the standard deviation values are represented along the x-axis 202 and the match score values are represented along the y-axis 204.

In FIG. 2, a variety of trend lines 206, 208, 210 have been plotted for the density function. These trend lines include a trend lines for linear, quadratic and cubic equations (i.e., a linear trend line 206, a quadratic trend line 208 and a cubic trend line 210) to provide data approximations of the density function. As can be seen in this exemplary implementation, all three approximations are fairly straight. Therefore, in one embodiment, a simple line equation (such as e.g., trend line 206) can be used to represent the trend followed in a match score versus standard deviation density function graph.

Figure 3:
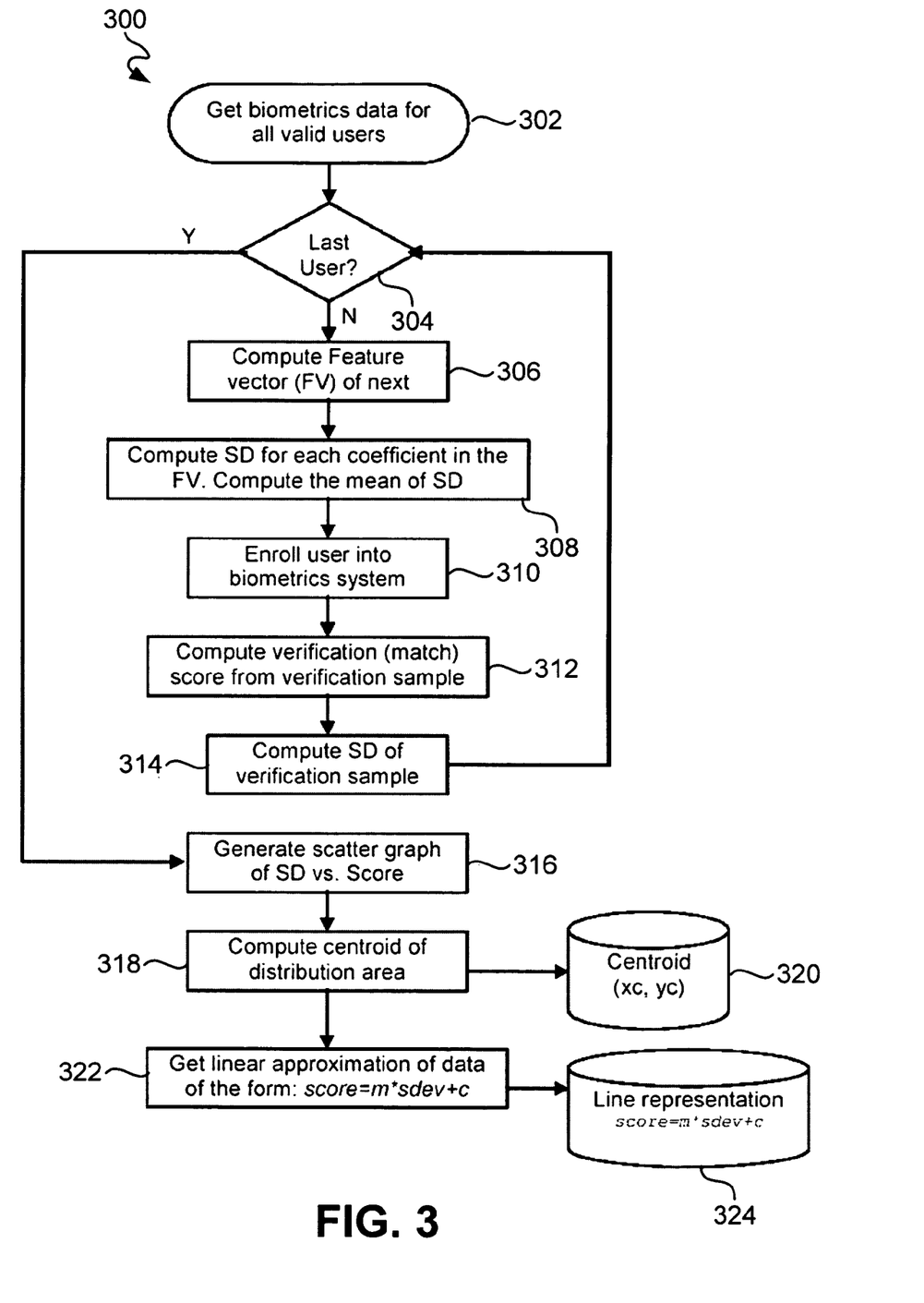
FIG. 3 is flowchart of a process for training a biometric system in accordance with an exemplary embodiment.

FIG. 3 is flowchart of a training process 300 for an biometric system in accordance with one embodiment. This training process 300 may be performed offline. In operation 302, biometric data for a test set of valid users may be obtained. As shown by the "No" path of decision 304, the biometric data for each user in the test set may then be subjected to the following iterative set of operations (operations 306-314).

In operation 306, a feature vector comprising one or more feature coefficients may be extracted from the biometric sample of a user. In operation 308, the standard deviation of each feature coefficient may then be calculated from which a mean of standard deviation for the feature vector may be calculated. The user may then be enrolled in the biometric system in operation 310. In operation 312, a verification match score (also referred to as a verification score) for the user may be calculated from a verification sample of the user (and return path to 304 may then be taken).

After the biometric data from the last user in the set has been subject to operations 306-314, the "Yes" path of decision 304 may be followed to operation 316. In operation 316, a scatter graph (i.e., density function graph) of the standard deviations versus the verification match scores may be generated using the standard deviations calculated in operation 314 and the verification match scores calculated in operation 312.

From the density function graph, a centroid for the distribution area of the plotted points may be calculated in operation 318 and stored in a centroid data store 320. The centroid may be represented in terms of its x- and y-axis values (i.e., a centroid standard deviation value and a centroid match score value).

In operation 322, a trend line of the density function generated in operation 316 may then be derived. As shown in FIG. 3, the derived trend line may comprise a linear trend line that is a linear approximation of the data and have the form: score=m*sdev+c. The trend line generated in operation 322 may then be stored in a line representation data store 324 (e.g., a database).

Computing a Correction Factor

Figure 4:
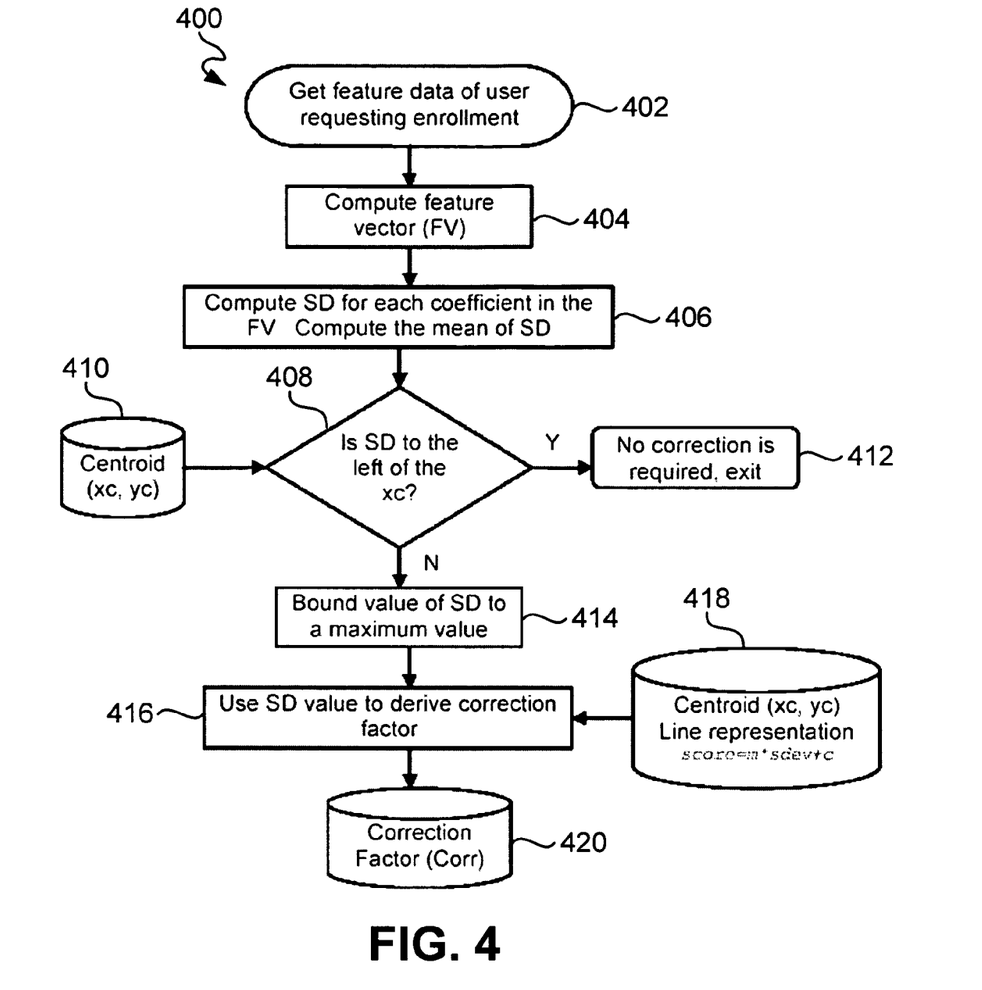
FIG. 4 is a flowchart of a process for deriving a correction factor in accordance with an exemplary embodiment.

During enrollment, the trend line relationship developed for a density function graph may be used to compute a correction factor that may be used in a biometric verification process. FIG. 4 is a flowchart of a process 400 for computing such a correction factor in accordance with an exemplary embodiment. In operation 402, a biometric sample (i.e., feature data) of an end user (i.e., a potential enrollee). In operation 404, a feature vector is obtained from the biometric sample. The standard deviation of each coefficient of the feature vector may be calculated and used to derive a mean of standard deviation for the feature vector (also referred to as the standard deviation of the feature vector) in operation 406.

With reference to decision 408, information about a centroid of a pre-calculated density function of match scores to standard deviations may be obtained from a centroid data store 410 (e.g., a database). The information about the centroid may include a centroid match score value (e.g., cy of centroid (cx, cy)) and a centroid standard deviation value (e.g., cx of centroid (cx, cy)). In decision 408, the standard deviation of the feature vector obtained in operation 406 may be compared to the centroid's standard deviation (i.e., cx). If the standard deviation of the feature vector is less than the standard deviation value of the centroid (i.e., to the left of the centroid in the density function graph), then no correction of the match score for the subject may be deemed needed in the biometric system and the subject may be enrolled into the biometric system in operation 412 (via the "Yes" path from decision 408).

If, on the other hand, the standard deviation of the feature vector obtained in operation 406 is greater than the standard deviation value of the centroid (i.e., to the right of the centroid in the density function graph), then the "No" path from decision 408 may be followed in order to calculate a correction factor for the potential enrollee.

Following the "No" path, a determination may be made in operation 414 to determine whether the value of the standard deviation of the feature vector calculated in operation 406 exceeds a maximum value. If the standard deviation is determined to exceed the maximum value, then the standard deviation value for the feature vector may be set (i.e., reduced or bound) to the maximum value in operation 414.

In one embodiment, the maximum value may, for example, correspond to a standard deviation value on the right side of the score versus standard deviation density functional graph at which approximately about 5% to about 20% (and preferably about 10%) of the total number of subjects (i.e., users) are located to the right of the value. Setting a maximum value for the standard deviation may be carried out in order to help avoid spurious corrections due to outliers with very large standard deviation values.

In operation 416, the value of the standard deviation of the feature vector computed in operation 406 (or modified value of the standard deviation per operation 414) may then be used to derive a correction factor for the feature vector. In one embodiment, the correction factor may be derived by applying the standard deviation value (or modified standard deviation value) to a line representation algorithm of the centroid of the pre-calculated density function of match scores to standard deviations. As previously described, in one embodiment, the line representation algorithm may be linear (e.g., a linear trend line), for example, and be represented as: score=m*sdev+c, where m is the slope of the line, "sdev" is the standard deviation and "c" is a constant defined at the intersection of the line to the match score axis of the density function graph. The line representation algorithm used in operation 416 may be obtained from a centroid line representation data store 418 that, in one embodiment, can comprise at least a portion of the centroid data store 410. The value output from operation 416 may be used as the correction factor for the given feature vector and stored in a correction factor data store 420. In one exemplary embodiment, the value of the correction factor may be derived from the algorithm: corr=cy−score, where "corr" is the correction factor, "cy" is the centroid match score (i.e., the match score of centroid (cx, cy)) and "score" is the line representation.

Thus, in accordance with an exemplary embodiment, the following illustrative pseudocode sets forth an illustrative process for deriving a correction score:

--- score = 0.63 * sdev + 1.4;
corr = yc-score;
where:
"score" is the line representation of the centroid of the density function;
"sdev" is the standard deviation of the feature vector or the maximum standard deviation value if the standard deviation of the feature vector exceeds the maximum standard deviation value;
"corr" is the correction factor; and
"yc" is the a centroid match score value (e.g., cy of centroid (cx, cy)).

---

Applying the Correction Factor

During verification, the match score of a user may be corrected with the applied correction depending on the reliability of the particular user's biometric. This way, the user's corrected score can serve as a match score adapted to the characteristics of the user's own voice or other biometric. As previously described with reference to FIG. 4, the correction value itself may be determined during the enrollment process. The application of a correction factor to a user's match score may be accomplished according to a process such as that set forth in FIG. 5.

Figure 5:
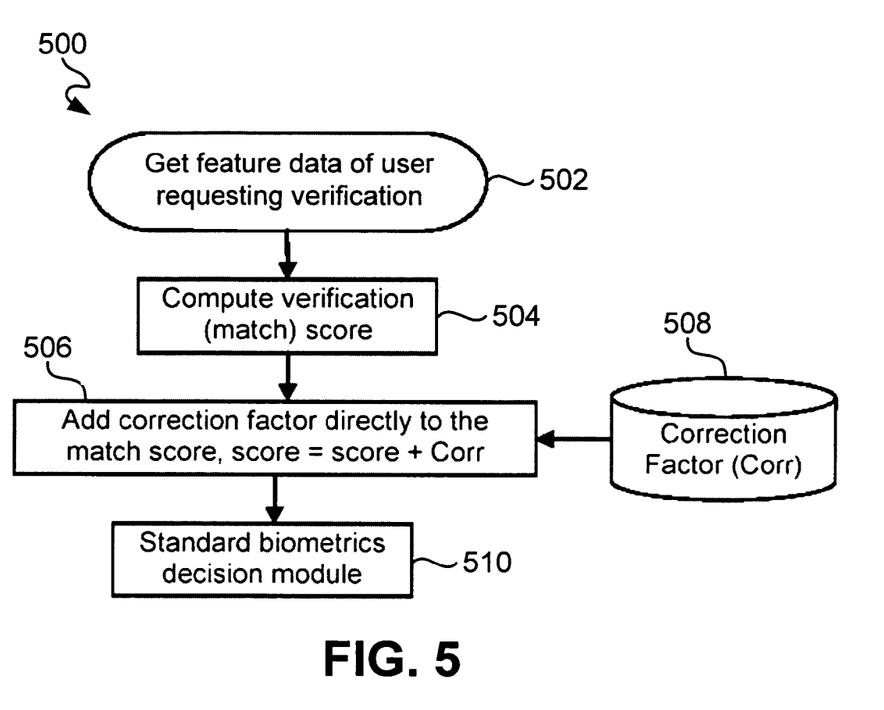
FIG. 5 is a flowchart of a verification process in which a correction factor may be applied in accordance with an exemplary embodiment.

FIG. 5 is a flowchart of a biometric verification process 500 in which a correction factor may be applied in accordance with an exemplary embodiment. In operation 502, feature vectors are obtained from biometric data input by a user claiming an identity (i.e., a "claimant"). In operation 504, a match score (or "verification score") may be calculated using the obtained feature vectors and, for example, a reference template associated with the claimed identity. If the claimed identity has a correction factor associated with it, then in operation 506, the correction factor (also referred to as "Corr") may be obtained from a correction factor data store 508 and added to the match score to obtain an adjusted match score for the claimant (e.g., adjusted match score=match score+correction factor). The adjusted match score may then be used by a biometrics decision module in operation 510 for deciding whether to accept or reject the claimant as the claimed identity.

The effect on decision making in a biometric verification system as a result of the application of a correction factor to a match score can be explained with reference to the exemplary density function graph 600 of FIG. 6. In the density function graph 600 shown in FIG. 6, each point (e.g., point 602) represents a claimant in an exemplary biometric verification system with each point indicating the match score and standard deviation of the given claimant.

A horizontal boundary line 604 extending across the density function graph 600 represents an illustrative threshold match score of the exemplary biometric verification system. The value of threshold match score (and thus the location of the boundary line 604 on the density function graph 600) is dependent of the specific biometric verification system and may be set to meet the needs of the particular implementation. The boundary line 604 divides the density function graph into upper and lower areas 606, 608. In the exemplary biometric verification system, claimants whose points are located in the upper area 606 are designated as imposters (i.e., an imposter zone) while claimants having points located in the lower area 608 are designated as valid subjects (i.e., a valid user zone).

Figure 6:
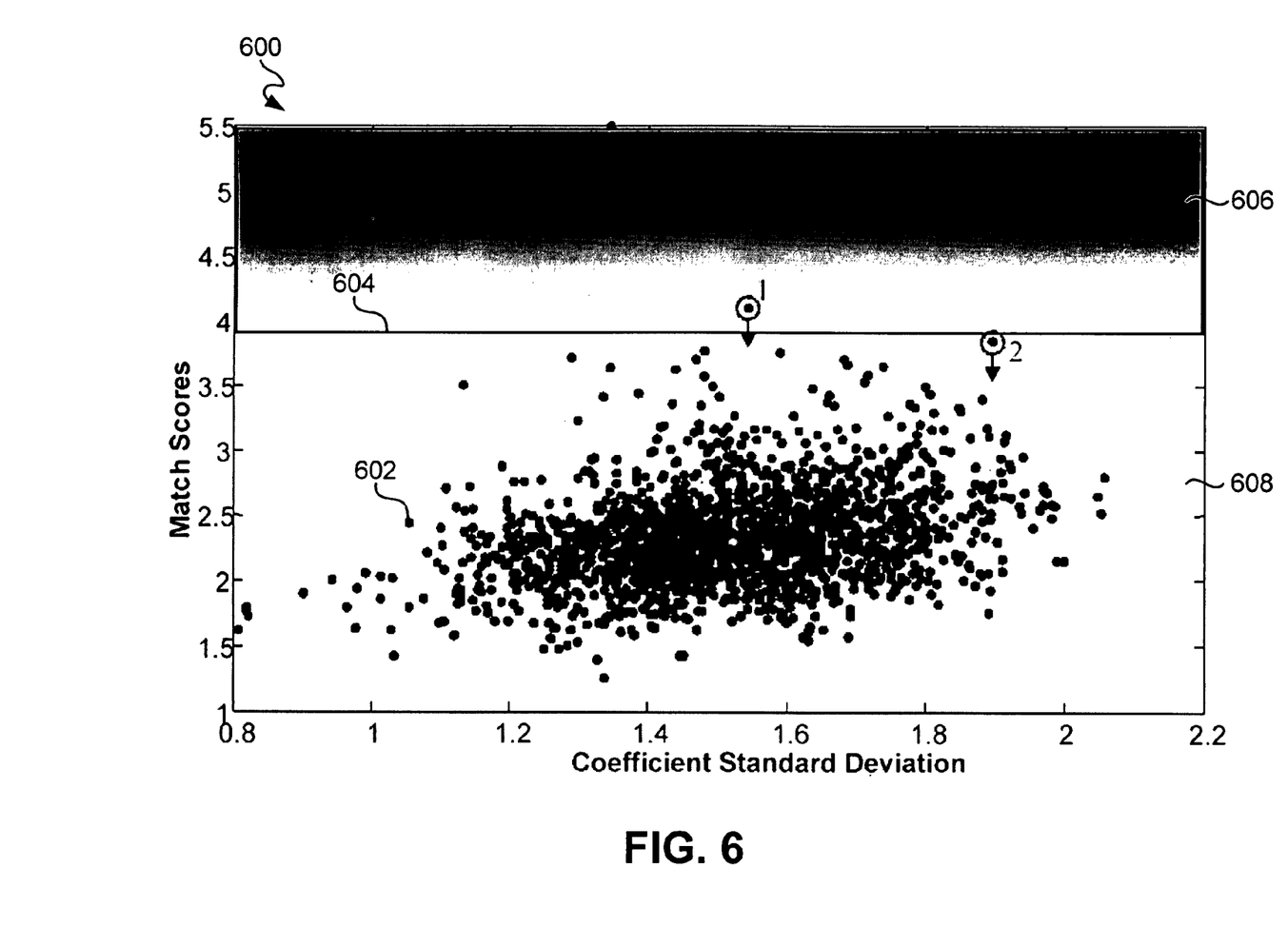
FIG. 6 is a density function graph illustrating an effect on decision making of the application of a correction factor to a match score in a biometric verification system in accordance with an exemplary embodiment.

As shown in FIG. 6, two claimants represented by the circled points are located close to the boundary line. Normally, claimant "1" would always be rejected (i.e., an imposter) by the exemplary biometric system. With respect to claimant "2," small variations in the voice sample of claimant "2" could cause the match score for claimant "2" to become larger and cross over the boundary line into the upper area and, as a result, the exemplary biometric system would frequently reject claimant "2" as an imposter.

By implementing the exemplary biometric verification system so that it can apply a correction factor to the match scores of claimants near the boundary line such as claimants "1" and "2," these claimants can be accepted as valid subjects by the biometric verification system. The application of a correction factor to the match scores of claimants "1" and "2" is represented by the downwards arrows. As represented by these arrows, the application of a correction factor to the match scores of claimants "1" and "2" effectively shifts the match scores downwards below the boundary line so that both claimants "1" and "2" would be more likely to be accepted as valid subjects by the biometric verification system.

Figure 7:
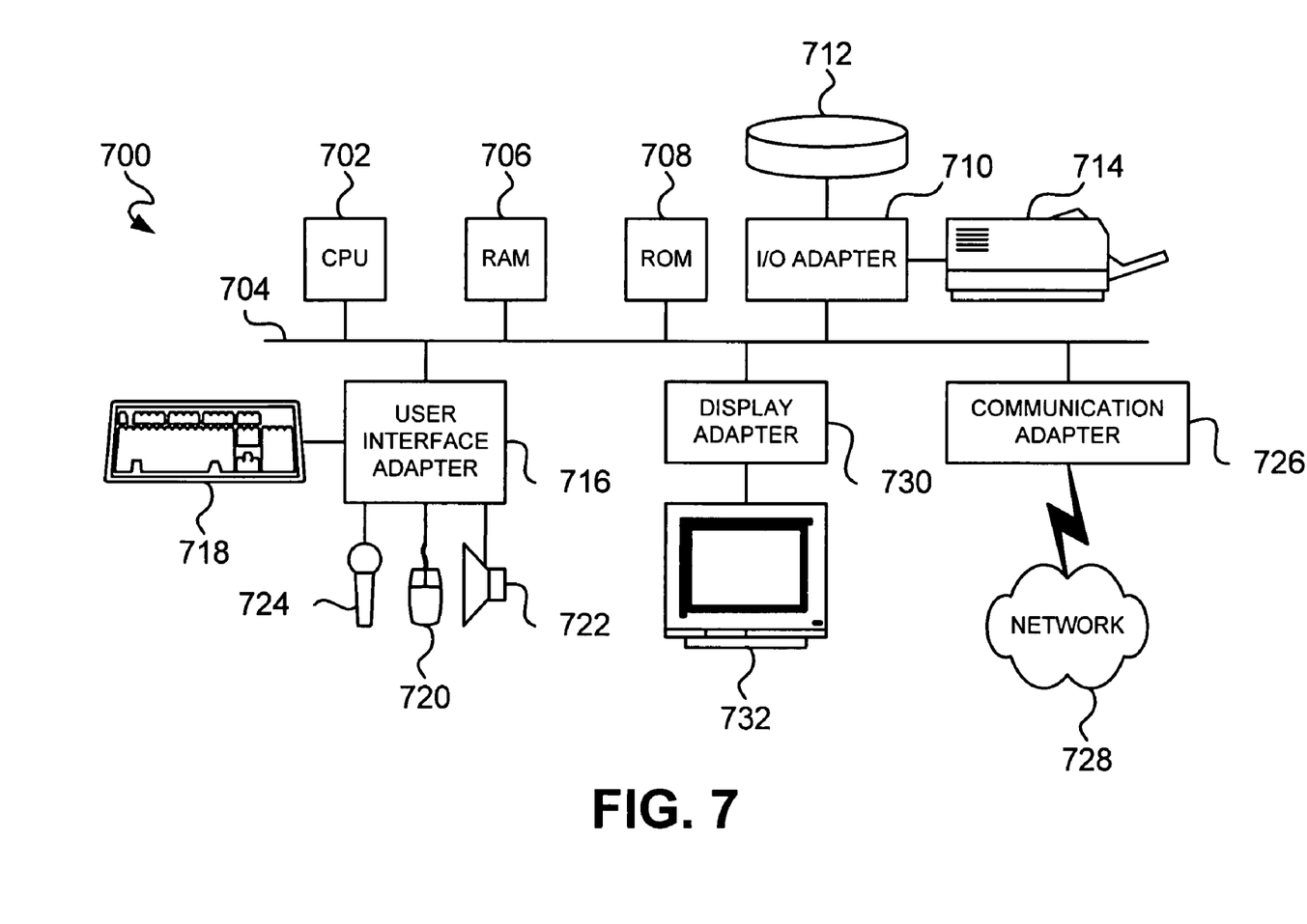
FIG. 7 is a schematic diagram of an illustrative hardware environment in accordance with an exemplary embodiment.

FIG. 7 illustrates an exemplary hardware configuration of a computer 700 having a central processing unit 702, such as a microprocessor, and a number of other units interconnected via a system bus 704. The computer 700 shown in FIG. 5 includes a Random Access Memory (RAM) 706, Read Only Memory (ROM) 708, an I/O adapter 710 for connecting peripheral devices such as, for example, disk storage units 712 and printers 714 to the bus 704, a user interface adapter 716 for connecting various user interface devices such as, for example, a keyboard 718, a mouse 720, a speaker 722, a microphone 724, and/or other user interface devices such as a touch screen or a digital camera to the bus 704, a communication adapter 726 for connecting the computer 700 to a communication network 728 (e.g., a data processing network) and a display adapter 730 for connecting the bus 704 to a display device 732. The computer may utilize an operating system such as, for example, a Microsoft Windows operating system (O/S), a Macintosh O/S, a Linux O/S and/or a UNIX O/S. Those of ordinary skill in the art will appreciate that embodiments may also be implemented on platforms and operating systems other than those mentioned. One of ordinary skilled in the art will also be able to combine software with appropriate general purpose or special purpose computer hardware to create a computer system or computer sub-system for implementing various embodiments described herein.

Embodiments of the present invention may also be implemented using computer program languages such as, for example, ActiveX, Java, C, and the C++ language and utilize object oriented programming methodology. Any such resulting program, having computer-readable code, may be embodied or provided within one or more computer-readable media, thereby making a computer program product (i.e., an article of manufacture). The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

In accordance with the foregoing, embodiments of a process for enrolling a subject in a biometric verification system may be implemented. In one implementation, a biometric sample may be captured from a subject requesting enrollment into a biometric system. From the captured biometric sample, at least one feature vector may be extracted with the feature vector comprising one or more coefficients. A standard deviation may be calculated for each of the coefficients of the feature vector. As an option, a mean standard deviation may be calculated from the coefficient standard deviations to represent the standard deviation for the feature vector.

Next, a determination may be made as to whether the value of the calculated standard deviation of the feature vector is greater than the value of a standard deviation represented by a centroid of a match score vs. standard deviation density function of, for example, a sample population. If the standard deviation of the feature vector is determined to be greater than the standard deviation of the centroid of the density function, then a correction factor may be derived for the subject based on a linear representation of a trend line of the density function and the standard deviation of the feature vector.

The correction factor may be derived from the difference between the value of a match score represented by the centroid of the match score vs. standard deviation density function and a match score for the subject derived from the trend line of the density function. In other words, the derivation of the correction factor may be performed by calculating an "expected" match score for the feature vector of the subject from the trend line of the density function and the standard deviation of the feature vector of the subject. The value of the "expected" match score may be subtracted from the value of a match score represented by the centroid of the match score vs. standard deviation density function with the output difference comprising the correction factor. The derivation of the correction factor may also include making a determination as to whether the standard deviation of the feature vector exceeds a maximum threshold value for standard deviation values (e.g., a predefined maximum value), and if it does, then replacing the standard deviation of the feature vector with the maximum standard deviation threshold value. In such a situation (i.e., when the standard deviation of the feature vector exceeds the maximum standard deviation threshold value), the maximum standard deviation threshold value may then be used instead of the originally calculated standard deviation of the feature vector with the trend line to derive the correction factor for the subject. The derived correction factor may be stored in a correction factor data store in a memory and/or memory device.

Embodiments of a process for verifying an identity of a claimant may also be implemented in accordance with the foregoing. In one implementation, a biometric capturing component may be used to capture a biometric sample from a claimant who claims a particular identity. In one embodiment, the biometric sample may comprise a speech sample (i.e., a vocal sample) made by the claimant. The captured biometric sample may then be passed to an extraction component that can extract at least one feature vector from the captured biometric sample.

The extracted feature may then be compared to a pre-generated reference template associated with the claimed identity (i.e., the reference template of an enrolled subject) to determine the degree (i.e., amount) of similarity between the extracted feature and the reference template. The degree of similarity may be represented by a match score that is output as a result of the comparison. In one implementation, this comparison may be carried out by a comparison component coupled to the extraction component.

Next, a determination may be made to determine whether the claimed identity has a correction factor associated therewith. This determination may be accomplished by searching a correction factor data store in which correction factors of enrolled subjects are stored. The correction factor data store may reside in a memory and/or a memory device. If a correction factor for the claimed identity is found during this search, then it may be retrieved from the correction factor data store and used to modifying the generated match score and thereby derive a modified match score. By modifying the match score with a correction factor, the degree of similarity between the feature vector and the reference template can be effectively increased for biometric purposes. In one embodiment, the modification of the match score may be performed by adding the correction factor to the match score. In implementations where lower match scores indicate a greater the degree of similarity (e.g., a match score of 2 indicates a greater match than a match score of 3) between the feature vector and the reference template, the correction factor may have a negative value so that the match score is lowered in value by the addition of the correction factor.

A decision component may then compare either the modified match score (if the claimed identity is determined to have a correction factor) or the unmodified match score (if the claimed identity is determined not to have a correction factor) to a decision threshold value to determine whether to accept the claimant as the claimed identity. If the value of the match score/modified match score of the claimant exceeds the decision threshold value, then the claimant may be rejected (i.e., classified as an imposter) by the biometric verification system.

The following references are hereby incorporated by reference herein in their entirety: A. K. Jain, A. Ross and S. Prabhakar, "An Introduction to Biometric Recognition," IEEE Transactions on Circuits and Systems for Video Technology, Special Issue on Image- and Video-Based Biometrics, Vol. 14, No. 1, pp. 4-20, January 2004; and Ruud M. Bolle, Sharath Pankanti, Nalini K. Ratha, "Evaluation Techniques for Biometric-Based Authentication Systems (FRR)," IBM Computer Science Research Report RC 21759, 2000.

Based on the foregoing specification, various embodiments may be implemented using computer programming or engineering techniques including computer software, firmware, hardware or any combination or subset thereof. Any such resulting program—having computer-readable code—may be embodied or provided in one or more computer-readable media, thereby making a computer program product (i.e., an article of manufacture) implementation of one or more embodiments described herein. The computer readable media may be, for instance, a fixed drive (e.g., a hard drive), diskette, optical disk, magnetic tape, semiconductor memory such as for example, read-only memory (ROM), flash-type memory, etc., and/or any transmitting/receiving medium such as the Internet and/or other communication network or link. An article of manufacture containing the computer code may be made and/or used by executing the code directly from one medium, by copying the code from one medium to another medium, and/or by transmitting the code over a network. In addition, one of ordinary skill in the art of computer science may be able to combine the software created as described with appropriate general purpose or special purpose computer hardware to create a computer system or computer sub-system embodying embodiments or portions thereof described herein.

While various embodiments have been described, they have been presented by way of example only, and not limitation. Thus, the breadth and scope of any embodiment should not be limited by any of the above described exemplary embodiments, but should be defined only in accordance with the following claims and their equivalents.

What is claimed:

1. A method, comprising:
   extracting a feature from a biometric sample captured from a subject requesting enrollment;
   calculating a standard deviation for the feature using a microprocessor, the standard deviation calculated from the biometric sample and at least one other biometric sample;
   determining whether the standard deviation of the feature is greater than a standard deviation of a centroid of a density function; and
   deriving a correction factor for the subject based on a trend line of the density function if the standard deviation of the feature is greater than the standard deviation of the centroid.

2. The method of claim 1, wherein the density function comprises a match score vs. standard deviation density function of a sample population.

3. The method of claim 1, wherein the correction factor is further derived from the difference between a mean score obtained from the centroid and a score for the subject derived from the trend line.

4. The method of claim 1, further comprising determining whether the standard deviation of the feature exceeds a threshold value, and using the threshold value in place of the standard deviation of the feature to derive the correction factor for the subject if the standard deviation of the feature exceeds the threshold value.

5. The method of claim 1, further comprising storing the correction factor in correction data store.

6. The method of claim 1, wherein the biometric sample comprises speech.

* * * * *